United States Patent Office 3,462,491
Patented Aug. 19, 1969

3,462,491
BENZHYDRYLOXYCYCLOPROPYLAMINES
AND THE SALTS THEREOF
Carl Kaiser, Haddon Heights, N.J., and Charles L. Zirkle, Berwyn, Pa., assignors to Smith Kline & French Laboratories, Philadephia, Pa., a corporation of Pennsylvania
No Drawing. Filed Jan. 6, 1966, Ser. No. 519,012
Int. Cl. C07c 93/12
U.S. Cl. 260—570                                                    7 Claims

ABSTRACT OF THE DISCLOSURE

Benzhydryloxycyclopropylamines wherein the amino moiety may be primary, secondary or tertiary and the benzhydryl moiety may be halogen, lower alkyl, lower alkoxy, lower alkylthio, lower alkylsulfonyl or trifluoromethyl substituted have mild tranquilizing and antidepressant activity.

---

This invention relates to novel benzhydryloxycyclopropylamine derivatives having useful pharmacodynamic activity. More specificially the compounds of this invention have mild tranquilizing and antidepressant activity as measured by standard experimental pharmacological procedures. These test procedures measure effects on performance of observing responses (stimulus-producing responses) in pigeons and fixed-internal responses in monkeys. Exemplary of the activity shown by the compounds of this invention in these procedures is the increase of fixed-internal response rates in squirrel monkeys at oral dosages of 1 to 10 mg./kg.

The novel benzhydryloxycyclopropylamines of this invention may be represented by the following general structural formula:

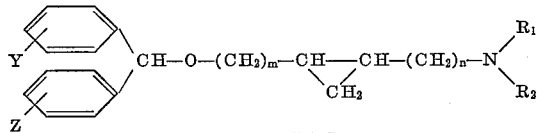

FORMULA I in which:

Y and Z each represent hydrogen, halogen such as chlorine, bromine or fluorine, lower alkyl such as methyl, lower alkoxy such as methoxy, lower alkylthio such as methylthio, lower alkylsulfonyl such as methylsulfonyl or trifluoromethyl;

$m$ and $n$ each represent an integer from 0 to 1; and $R_1$ and $R_2$ each represent hydrogen, lower alkyl of from 1 to 3 carbon atoms or when taken together with the nitrogen atom to which they are attached, represent a pyrrolidine, piperidine, N'-methylpiperazine, N'-($\beta$-hydroxyethyl)-piperazine or N'-($\beta$-acetoxyethyl)-piperazine ring.

Prepared compounds of this invention are represented by the above Formula I when $m$ is 1.

The nontoxic pharmaceutically acceptable acid addition salts of the compounds of Formula I are also included within the scope of this invention. Both organic and inorganic acids can be employed to form such salts, illustrative acids being sulfuric, nitric, phosphoric, hydrochloric, citric, acetic, lactic, tartaric, pamoic, ethanedisulfonic, sulfamic, succinic, cyclohexylsulfamic, fumaric, maleic, benzoic and the like. These salts are readily perpared by methods known to the art.

The compounds of this invention may be present as cis-trans isomers due to the geometrical arrangement of the benzhydryloxy and amino moieties with respect to the cyclopropane ring and further as $d$, $l$ optical isomers. Unless otherwise specified in the description and accompanying claims, it is intended to include all isomers, whether separated or mixtures thereof.

The novel benzhydryloxycyclopropylamines of this invention are prepared by several methods, the choice of which depending on the definitions of $m$, $n$, $R_1$ and $R_2$. In one method of preparation an appropriate benzhydryl vinyl ether is reacted with ethyl diazoacetate to give a mixture of cis- and trans-benzhydryloxy cyclopropanecarboxylates. The benzhydryl vinyl ethers are conveniently prepared via Hofmann degradation of corresponding benzhydryl dimethylaminoethyl ether methiodide salts. The above mixture of carboxylates is hydrolyzed with alkali to give after separation by fractional recrystallization the corresponding cis- and trans-benzhydryloxy cyclopropanecarboxylic acids. Alternatively the trans-cyclopropanecarboxylic acids are prepared by reacting an appropriate benzhydrol with, for example, ethyl 2-bromocyclopropanecarboxylate followed by hydrolysis. Both isomeric acids are thus available for further reaction as described hereinbelow.

The useful cyclopropanecarboxylic acids thus prepared having the following formula:

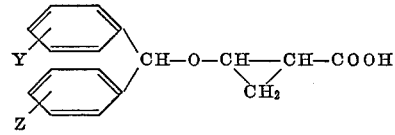

FORMULA II in which Y and Z are as defined in Formula I are converted to amino compounds of this invention by several routes. Reaction of either the cis or trans acid of Formula II with the lower alkyl haloformate gives the corresponding cyclopropyl mixed anhydride which is then treated with sodium azide to give the cyclopropyl azide. The acid azide is then thermally decomposed by heating in an inert organic solvent to give the corresponding isocyanate. The resulting isocyanate is converted to aminocyclopropanes of Formula I where $m$ and $n$ are 0 by:
(a) hydrolysis with a mineral acid such as hydrochloric acid or an alkali metal hydroxide such as sodium or potassium hydroxide at elevated temperatures to give the primary aminocyclopropane or (b) reaction with a lower alkyl magnesium halide or lower alkanol to give an N-lower acyl or N-lower carbalkoxy aminocyclopropane, respectively, which is either reduced directly with, for example, lithium aluminum hydride to give an N-lower alkyl aminocyclopropane or further reacted with a lower alkyl iodide to give an N-lower alkyl-N-lower acyl or N-lower alkyl-N-lower carbalkoxy aminocyclopropane, respectively, which is reduced with, for example, lithium aluminum hydride to give an N,N-dialkylaminocyclopropane.

The aminocyclopropanes of Formula I where $m$ is 0 and $n$ is 1 are prepared from the cyclopropanecarboxylic acids of Formula II by reacting the acid with a lower alkyl haloformate to give the corresponding cyclopropyl mixed anhydride which is then treated with ammonia, a monoalkyl amine, a dialkylamine or a heterocyclic amine to give the cyclopropanecarboxamide of the following formula:

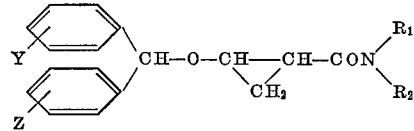

FORMULA III in which Y and Z are as defined in Formula I, $R_1$ is hydrogen or lower alkyl, and $R_2$ is lower alkyl or when $R_1$ and $R_2$ are taken together with the nitrogen atom to which they are attached, represent a pyrrolidine, piperidine or N'-methylpiperazine ring. Reduction of the amide with, for example, lithium aluminum hydride gives the corresponding aminomethylcyclopropane.

Alternatively, to prepare the trans-aminocyclo propanes of Formula I where $m$ is 0 and $n$ is 1, an appropriate benzhydrol is reacted with a 2-bromocyclopropanecarboxamide to form the trans-carboxamide derivative of Formula III which is reduced with, for example, lithium aluminum hydride to give the corresponding aminomethylcyclopropanes. The 2-bromocyclopropanecarboxamides are readily prepared from the corresponding carboxylic esters by hydrolysis, conversion to the acid chloride and treatment with a secondary amine.

The novel aminocyclopropanes of this invention represented by Formula I above where $m$ and $n$ are 1 are prepared by reaction of an appropriate benzhydryl halide, preferably chloride, with an aminomethylcyclopropyl carbinol, preferably as an alkali metal salt, for example, sodium. These useful carbinol intermediates having the formula:

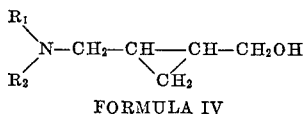

FORMULA IV in which $R_1$ and $R_2$ are lower alkyl or when taken together with the nitrogen atom to which they are attached, represent a pyrrolidine, piperidine or N'-methylpiperazine ring are prepared by reaction of, for example, the acid chloride of 2-carbethoxycyclopropanecarboxylic acid with an appropriate dialkylamine or heterocyclic amine to give the corresponding carboxamide which is then reduced with, for example, lithium aluminum hydride to give the aminomethyl carbinol.

The compounds of this invention represented by Formula I where $m$ is 1 and $n$ is 0 are similarly prepared by reaction of an appropriate benzhydryl halide with an aminocyclopropyl carbinol of the formula:

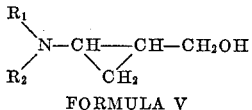

FORMULA V in which $R_1$ and $R_2$ are as defined in Formula IV above. These carbinols are prepared by reaction of, for example, ethyl 2-bromocyclopropanecarboxylate with an appropriate amide or carbamate derivative followed by reduction with, for example, lithium aluminum hydride to give the aminocyclopropyl carbinol.

The compounds of Formula I above where $R_1$ and $R_2$ together represent a heterocyclic amino moiety are prepared also from the corresponding primary amines. The pyrrolidinyl and piperidinyl derivatives are prepared from the primary amine and 1,4-dibromobutane and 1,5-dibromopentane, respectively, in an organic solvent refluxing at a temperature from 100–150° C. and in the presence of potassium carbonate. Similar reaction of the primary amine with methyl bis-(β-chloroethyl)-amine gives the N'-methylpiperazinyl derivative.

The novel compounds of this invention may be administered orally or paraenterally in conventional dosage forms such as tablets, capsules, injectables or the like, by incorporating the appropriate dose of a compound of Formula I with carriers according to acepted pharmaceutical practices.

The foregoing is a general description of the main synthetic routes in the preparation of the aminocyclopropanes of this invention. It will be readily apparent to one skilled in the art that variations of these procedures are possible. The following examples illustrate these procedures but should not be construed as limiting the invention to the specific compounds prepared thereby. Where the examples specify reaction of a trans compound, the corresponding cis isomer can of course be similarly employed.

Example 1

To a solution of 102 g. of benzhydryl dimethylaminoethyl ether in 500 ml. of acetone is added 72 g. of methyl iodide. The crystalline methiodide is filtered and washed with ether, M.P. 194–196° C.

A mixture of excess anion exchange resin (methoxide form), 140 g. of benzhydryl dimethylaminoethyl ether methiodide and 500 ml. of methanol is stirred at room temperature for one hour, then filtered. The filtrate is concentrated under reduced pressure and the residue is heated at 100° C./18 mm. until decomposition is complete. Distillation of the residual oil gives the colorless liquid benzhydryl vinyl ether, B.P. (18 mm.) 163–167° C.

To a stirred and refluxing mixture of 2 g. of anhydrous cupric sulfate powder in 150 ml. of dry xylene is added dropwise a solution of 20 g. of ethyl diazoacetate and 29.5 g. of benzhydryl vinyl ether in 50 ml. of dry xylene. After addition is complete the mixture is stirred and refluxed for one hour, filtered and the filtrate concentrated in vacuo. Distillation of the residual oil gives ethyl 2-(benzhydryloxy)-cyclopropanecarboxylate, B.P. 155–174° C./0.8–1.0 mm.

To a solution of 21.8 g. of the above carboxylate in 100 ml. of ethanol is added a solution of 10 g. of potassium hydroxide in 20 ml. of water. The mixture is stirred and refluxed for two hours, concentrated and diluted with water. Some insoluble material is extracted with ether and the aqueous portion is made acidic with acetic acid to give a mixture of cis- and trans-2-(benzhydroloxy)-cyclopropanecarboxylic acid which is separated by fractional recrystallization from ethyl acetate/petroleum ether.

To a stirred suspension of 5.4 g. of 2-(benzhydryloxy)-cyclopropanecarboxylic acid (M.P. 138–140° C.) in 50 ml. of acetone is added 2.2 g. of triethylamine. The solution is cooled to −10° C. and a solution of 25 g. of ethyl chlorocarbonate in 50 ml. of acetone is added dropwise. After stirring in the cold for 15 minutes a solution of 3.8 g. of sodium azide in 25 ml. of water is added dropwise. The mixture is stirred at −10° C. for 30 minutes, poured into 350 ml. of water and extracted with toluene. The dried toluene extract is heated carefully on a steam bath and after nitrogen evolution subsides, the solution is refluxed for 30 minutes, then concentrated in vacuo to give 2-(benzhydryloxy)-cyclopropyl isocyanate. The latter in 50 ml. of ether is added dropwise to a stirred mixture of 35 ml. of approximately 3 M methyl magnesium bromide in 50 ml. of ether. The mixture is stirred and refluxed for two hours, cooled and 200 ml. of 10% hydrochloric acid is added, slowly at first. The separated aqueous layer is extracted with ether and the combined, dried ether extract is concentrated to give N-acetyl-2-(benzhydryloxy)-cyclopropylamine, M.P. 111–112° C.

To a solution of 3.1 g. of the above N-acetyl derivative in 70 ml. of tetrahydrofuran is added 0.54 g. of a 53.5% dispersion of sodium hydride in mineral oil. The mixture is stirred and refluxed for one hour, cooled and 3 ml. of ethyl iodide in 25 ml. of tetrahydrofuran is added dropwise. The resulting mixture is stirred and refluxed for four hours, an additional 3 ml. of ethyl iodide in 25 ml. of tetrahydrofuran is added and refluxing and stirring is continued overnight. The reaction mixture is filtered and the filtrate concentrated in vacuo. The residue is suspended in water, extracted with ether and the dried ether extract concentrated to give N-acetyl-N-ethyl-2-(benzhydryloxy)-cyclopropylamine. The latter is dissolved in 50 ml. of dry ether and the solution is added dropwise to a stirred suspension of 2.0 g. of lithium aluminum hydride in 75 ml. of ether. The mixture is stirred and refluxed for six hours, then decomposed by addition of 2 ml. of water, 2 ml. of 10% sodium hydroxide solution and 6 ml. of water. The precipitated salts are filtered and the filtrate is concentrated in vacuo to a colorless oil which is dissolved in acetone and treated with ethereal-hydrogen chloride to give N,N-diethyl-2-(benzhydryloxy)-cyclopropylamine hydrochloride, M.P. 129–131° C.

Direct hydrolysis of the above 2-(benzhydryloxy)-cyclopropyl isocyanate yields the corresponding primary cyclopropylamine.

Example 2

To a solution of 5.4 g. of 2-(benzhydryloxy)-cyclopropanecarboxylic acid (isomer melting at 138–140° C. as prepared in Example 1) in 25 ml. of acetone, cooled to 0° C., is added a solution of 4.7 ml. of triethylamine in acetone. In the cold is added 3.3 ml. of ethyl chloroformate and the mixture is stirred for 30 minutes. A solution of 4 ml. of piperidine in acetone is added, the mixture is stirred for two hours at room temperature, then poured into ice-water and extracted with methylene chloride. The dried extract is evaporated to give N-piperidinoyl-2-(benzhydryloxy)-cyclopropane.

An ethereal solution of the above piperidinoyl derivative (5.8 g.) is added to a suspension of 1.5 g. of lithium aluminum hydride in 75 ml. of ether and the mixture is stirred and refluxed for seven hours. After standing overnight at room temperature the reaction mixture is decomposed, filtered and the dried filtrate evaporated to give 1-benzhydryloxy-2-(N - piperidinylmethyl)-cyclopropane hydrochloride, M.P. 201–203° C.

Similarly, by employing N-methylpiperazine instead of piperidine in the above reaction sequence, the corresponding 1 - benzhydryloxy-2-(N'-methyl-N-piperazinylmethyl)-cyclopropane is obtained.

Example 3

To 140 g. of trans-2-carbethoxycyclopropanecarboxylic acid is added 137 g. of thionyl chloride. The solution is allowed to stand at room temperature overnight, then heated on the steam bath for one hour. The oil is distilled to give trans-2-carbethoxycyclopropanecarbonyl chloride, B.P. 113–120° C./30 mm.

A solution of the above chloride (35.3 g.) in 350 ml. of ether is treated with gaseous dimethylamine until distinctly alkaline. The mixture is allowed to stand at 0° C. for 30 minutes, then water is added. The dried ether layer is concentrated to give trans-N,N-dimethyl-2-carbethoxycyclopropanecarboxamide.

To a stirred suspension of 15.2 g. of lithium aluminum hydride in 500 ml. of ether is added dropwise a solution of 37.0 g. of the above carboxamide in 150 ml. of ether. After addition is complete the mixture is stirred and refluxed for two hours, then allowed to stand at room temperature for 64 hours. The reaction mixture is decomposed, filtered and the filtrate concentrated. The residue is distilled to give trans - 1 - (N,N - dimethylaminomethyl) - 2 - hydroxymethylcyclopropane, B.P. 126–127° C./38 mm.

To a suspension of 2.3 g. of sodium hydride (52%) in 20 ml. of dimethylsulfoxide is added a solution of 6.5 g. of the above hydroxymethyl derivative in 10 ml. of dimethylsulfoxide at 20–25° C. The mixture is heated at 50° C. and a solution of 10.2 g. of benzhydryl chloride in 10 ml. of dimethylsulfoxide is added. The resulting mixture is heated on the steam bath for about 45 minutes, poured into ice-water and extracted with ether. The ether is extracted with dilute hydrochloric acid, made basic with 40% sodium hydroxide solution and extracted with ether. The dried extract is evaporated to give trans-1 - benzhydryloxymethyl - 2 - (N,N - dimethylaminomethyl) - cyclopropane, B.P. 158–162° C./0.3–0.6 mm.; hydrochloride, M.P. 84–86.5° C.

Similarly, by reacting 6.5 g. of the above hydroxymethyl derivative with 11.0 g. of p-fluorobenzhydryl chloride, 11.5 g. of p - chlorobenzhydryl chloride or 14.0 g. of p-bromobenzhydryl chloride there is obtained trans-1 - (p - fluorobenzhydryloxymethyl) - 2 - (N,N - dimethylaminomethyl) - cyclopropane, trans - 1 - (p - chlorobenzhydryloxymethyl) - 2 - (N,N - dimethylaminomethyl) - cyclopropane and trans - 1 - (p - bromobenzhydryloxymethyl) - 2 - (N,N - dimethylaminomethyl) - cyclopropane, respectively.

Example 4

To a stirred suspension of 4.7 g. of a 52% suspension of sodium hydride in mineral oil in 75 ml. of dimethylsulfoxide is added dropwise a solution of 11.4 g. of ethyl methylcarbamate in 25 ml. of dimethylsulfoxide, with external cooling to maintain temperature at 25–30° C. After hydrogen evolution is complete a solution of 19.3 g. of ethyl 2 - bromocyclopropanecarboxylate in 40 ml. of dimethylsulfoxide is added dropwise, temperature increasing to 40° C. The solution is then heated at 50–60° C. for 30 minutes, poured into water and extracted with ether. The dried extract is concentrated, the residue taken into 100 ml. of acetonitrile and the mixture is extracted with petroleum ether. The acetonitrile solution is concentrated in vacuo to give ethyl trans - N - methyl - 2-carbethoxycyclopropanecarbamate, B.P. 135–156° C./22 mm.

To a stirred suspension of 6.0 g. of lithium aluminum hydride in 400 ml. of ether is added dropwise a solution of 9.2 g. of the above carbamate derivative in 100 ml. of ether. The mixture is stirred and refluxed for 90 minutes, then decomposed and filtered. The dried filtrate is concentrated to give trans - N,N - dimethyl - 2 - hydroxymethylcyclopropylamine, B.P. 86–90° C./22 mm.

To a suspension of 2.3 g. of 52% sodium hydride in 20 ml. of dimethylsulfoxide is added a solution of 5.75 g. of the above hydroxymethyl derivative in 10 ml. of dimethylsulfoxide at 20–25° C. The mixture is heated at 50–55° C. for 20 minutes, cooled to 20° C. and a solution of 10.2 g. of benzhydryl chloride in 10 ml. of dimethylsulfoxide is added. The resulting mixture is heated on the steam bath for 45 minutes, poured into ice-water and extracted with ether. The cold ether solution is extracted with dilute hydrochloric acid, made basic with 40% sodium hydroxide solution and extracted with ether. The dried extract is evaporated to give trans - 1 - (N,N-dimethylamino) - 2 - benzhydryloxymethylcyclopropane, B.P. 151–154° C./0.3–0.6 mm.; citrate M.P. 128–130° C.

Similarly, by reacting 5.75 g. of the above hydroxymethyl derivative with 13.5 g. of o,o' - dichlorobenzhydryl chloride or 11.5 g. of o,o' - dimethylbenzhydryl chloride there is obtained trans - 1 - (N,N-dimethylamino) - 2 - (o,o' - dichlorobenzhydryloxymethyl) - cyclopropane and trans - 1 - (N,N - dimethylamino) - 2 - (o,o' - dimethylbenzhydryloxymethyl)-cyclopropane, respectively.

Example 5

To a solution of 6.4 g. of p-trifluoromethylbenzhydrol in 20 ml. of dimethylsulfoxide is added in portions of 1.2 g. of a 53.5% suspension of sodium hydride in mineral oil, maintaining the temperature below 40° C. A solution of 4.8 g. of ethyl 2 - bromocyclopropanecarboxylate in 10 ml. of dimethylsulfoxide is added dropwise and the mixture is heated on the steam bath for one hour. The reaction mixture is poured onto ice/water mixture and extracted with ether. The dried extract is concentrated to give ethyl 2 - (p - trifluoromethylbenzhydryloxy)-cyclopropanecarboxylate.

A mixture of 8.3 g. of the above carboxylate derivative in 100 ml. of ethanol and 2.6 g. of potassium hydroxide in water is stirred and refluxed for two hours. The alcohol is replaced by water using a trap and the filtered aqueous solution is extracted with ether. Acidification with concentrated hydrochloric acid gives a solid which is taken up in ethyl acetate. This solution is dried and evaporated to give an oil which is crystallized from ethyl acetate-petroleum ether to give trans - 2 - (p-trifluoromethylbenzhydryloxy) - cyclopropanecarboxylic acid.

To a mixture of 3.7 g. of the above trans carboxylic acid and 3 ml. of triethylamine, cooled to 0° C., is added 2 ml. of ethyl chloroformate in acetone. The mixture is stirred for 15 minutes and then 4.4 g. of N - (β - hydroxyethyl)piperazine in acetone is added with cooling. After stirring for three hours at room temperature, the reaction mixture is poured into cold water and extracted with ether. The dried extract is evaporated to give trans - 2- (p - trifluoromethylbenzhydryloxy) - N - [N' - (β - hydroxyethyl)]-piperazinocyclopropane.

To a suspension of 1.0 g. of lithium aluminum hydride in ether is added a suspension of 3.7 g. of the above piperazinoyl derivative in ether and the mixture stirred and refluxed for eight hours. After standing overnight at room temperature, the reaction mixture is decomposed, filtered and the filtrate acidified with ethanol-ethereal hydrogen chloride. Addition of excess ether precipitates the solid trans - 2 - (p - trifluoromethylbenzhydryloxy) - N-[N' - (β - hydroxyethyl)] - piperazinylmethylcyclopropane hydrochloride. Acetylation with acetyl chloride yields the corresponding β-acetoxyethyl derivative.

Example 6

A solution of 9.4 g. of trans-2-(p-trifluoromethylbenzhydryloxy)-cyclopropanecarboxylic acid (prepared as in Example 5) in acetone is treated with 7 ml. of triethylamine in acetone. The resulting mixture is cooled to 0° C. and 5 ml. of ethyl chloroformate in acetone is added. After stirring for 20 minutes, a solution of 7.1 g. of dimethylamine in acetone is added and stirring continued for 30 minutes with cooling and then for two hours at room temperature. The reaction mixture is poured into ice/water, extracted with methylene chloride and the dried extract evaporated. The residue is taken up in ether, extracted with 10% sodium hydroxide solution and the dried ether solution evaporated to give the solid trans-2- (p-trifluoromethylbenzhydryloxy) - N,N - dimethylcarboxamidocyclopropane.

To 2.5 g. of lithium aluminum hydride in ether is added a solution of 9.4 g. of the above carboxamido derivative in ether and the mixture is stirred and refluxed for eight hours. After standing at room temperature overnight, the reaction mixture is decomposed, filtered and the filtrate evaporated. The residue is taken up in ethanol and treated with ethereal hydrogen chloride. Addition of excess ether precipitates the solid trans-2-(p-trifluoromethylbenzhydryloxy)-N,N-dimethylaminomethylcyclopropane hydrochloride.

Similarly, by employing 11 g. of pyrrolidine instead of dimethylamine in the above reaction sequence with subsequent reduction by 2.5 g. of lithium aluminum hydride there is obtained trans-2-(p-trifluoromethylbenzhydryloxy)-N-pyrrolidinylmethylcyclopropane.

Example 7

To a suspension of 4 g. of lithium aluminum hydride in either is added a solution of 8.3 g. of N-acetyl-2-(benzhydryloxy)-cyclopropylamine (prepared as described in Example 1) in ether and the mixture stirred and refluxed for eight hours. The reaction mixture is decomposed, filtered and the filtrate evaporated to give 2-(benzhydryloxy)-N-monoethylaminocyclopropane.

Example 8

To a stirred solution of 4.9 g. of p-methoxybenzhydrol in 50 ml. of dimethylsulfoxide is added, in portions, 0.95 g. of 52% dispersion of sodium hydride in mineral oil. The mixture is heated at 60–70° C. for 20 minutes, then cooled to 20° C. and a solution of 4.0 g. of 2-bromo-N,N-dimethylcyclopropanecarboxamide in 20 ml. of dimethylsulfoxide is added dropwise. The resulting mixture is heated at 100° C. for one hour, cooled, diluted with 500 ml. of ice/water and extracted with ether. The extract is dried and concentrated to give trans-2-(p-methoxybenzhydryloxy)-N,N-dimethylcarboxamidocyclopropane.

A solution of this amide in 50 ml. of dry ether is added dropwise to a stirred suspension of 1.6 g. of lithium aluminum hydride in 150 ml. of ether. The mixture is stirred and refluxed for four hours. To the cooled reaction mixture is added dropwise 1.6 ml. of water followed by 1.6 ml. of 10% aqueous sodium hydroxide and an additional 4.8 ml. of water. The resulting mixture is filtered and the filtrate extracted with aqueous acetic acid. The acid extract is made alkaline with dilute sodium hydroxide solution and the mixture extracted with ether. The dried ether extract is concentrated to give trans-2-(p-methoxybenzhydryloxy) - N,N-dimethylaminomethylcyclopropane. Treatment of the free base with ethereal hydrogen chloride gives the hydrochloride salt.

Similarly, by employing in the above reaction sequence 5.3 g. of p-methylthiobenzhydrol or 6.0 g. of p-methylsulfonylbenzhydrol there is obtained trans-2-(p-methylthiobenzhydryloxy) - N,N - dimethylaminomethylcyclopropane and trans-2-(p-methylsulfonylbenzhydryloxy)-N,N-dimethylaminomethylcyclopropane, respectively.

What we claim is:

1. A chemical compound or its salts with pharmaceutically acceptable acids, said compound having the formula:

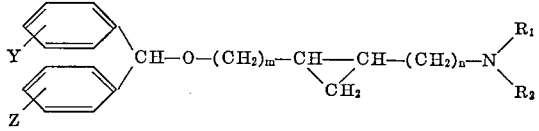

in which:

Y and Z are hydrogen, chlorine, bromine, fluorine, trifluoromethyl, methyl, methoxy, methylthio or methylsulfonyl;

$m$ and $n$ each represent an integer of from 0 to 1; and $R_1$ and $R_2$ are, when taken individually, hydrogen or lower alkyl of from 1 to 3 carbon atoms.

2. A chemical compound according to claim 1 in which $R_1$ and $R_2$ are lower alkyl of from 1 to 3 carbon atoms.

3. A chemical compound according to claim 2 in which $m$ is 1 and $n$ is 0.

4. A chemical compound according to claim 3 in which Y and Z are hydrogen, and $R_1$ and $R_2$ are methyl.

5. A chemical compound according to claim 4 in which the geometrical arrangement is trans.

6. A chemical compound according to claim 2 in which Y is chlorine, Z is hydrogen or chlorine, and $R_1$ and $R_2$ are methyl.

7. A chemical compound according to claim 2 in which Y is hydrogen, Z is trifluoromethyl, $m$ is 0, $n$ is 1, and $R_1$ and $R_2$ are methyl.

References Cited

UNITED STATES PATENTS

| 2,508,499 | 5/1950 | Cusic | 260—570 XR |
| 2,520,516 | 8/1950 | Zoeren | 260—329 |

FOREIGN PATENTS 686,004  1/1953  Great Britain.

ROBERT V. HINES, Primary Examiner

U.S. Cl. X.R.

260—268, 293.4, 294, 294.7, 326.3, 326.5, 344, 349, 453, 468, 471, 473, 501.12, 501.18, 501.19, 520, 546, 559, 561, 563, 567.6, 611, 649; 424—250, 267, 274, 330